United States Patent
Iwai et al.

(10) Patent No.: US 9,438,398 B2
(45) Date of Patent: *Sep. 6, 2016

(54) WIRELESS BASE STATION APPARATUS, WIRELESS TERMINAL APPARATUS, FREQUENCY RESOURCE ALLOCATION METHOD, AND METHOD OF FORMING TRANSMISSION SIGNAL

(71) Applicant: Sun Patent Trust, New York, NY (US)

(72) Inventors: Takashi Iwai, Ishikawa (JP); Akihiko Nishio, Osaka (JP); Daichi Imamura, Beijing (CN); Seigo Nakao, Singapore (SG); Yoshihiko Ogawa, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,444

(22) Filed: Oct. 5, 2015

(65) Prior Publication Data

US 2016/0028523 A1    Jan. 28, 2016

Related U.S. Application Data

(63) Continuation of application No. 14/673,069, filed on Mar. 30, 2015, now Pat. No. 9,184,891, which is a continuation of application No. 13/258,351, filed as application No. PCT/JP2010/002616 on Apr. 9, 2010, now Pat. No. 9,019,906.

(30) Foreign Application Priority Data

Apr. 10, 2009 (JP) ................................. 2009-096221

(51) Int. Cl.
*H04W 72/04* (2009.01)
*H04L 5/00* (2006.01)
(Continued)

(52) U.S. Cl.
CPC ............. *H04L 5/0048* (2013.01); *H04L 5/006* (2013.01); *H04L 5/0041* (2013.01);
(Continued)

(58) Field of Classification Search
CPC .......... H04L 5/0048; H04W 72/0453; H04W 88/08
See application file for complete search history.

(56) References Cited

U.S. PATENT DOCUMENTS 8,780,851 B2    7/2014 Nishikawa et al.
9,019,906 B2    4/2015 Iwai et al.
(Continued)

FOREIGN PATENT DOCUMENTS

| JP | 2010-232743 A | 10/2010 |
| JP | 5474053 B2 | 4/2014 |
| WO | 2009/022392 A1 | 2/2009 |

OTHER PUBLICATIONS

3GPP TS 36.211 V8.5.0, "3rd Generation Partnership Project; Technical Specification Group Radio Access Network; Evolved Universal Terrestrial Radio Access (E-UTRA); Physical Channels and Modulation (Release 8)," Dec. 2008, 82 pages.
(Continued)

*Primary Examiner* — Jamal Javaid
(74) *Attorney, Agent, or Firm* — Seed IP Law Group PLLC

(57) ABSTRACT

A wireless base station apparatus and wireless terminal apparatus with a configuration which can prevent reductions in the accuracy of channel estimation when non-contiguous band transmission and SRS transmission are employed in an uplink line. In the base station apparatus (100), an allocation setting unit (106), which sets the reception band of an SRS at an SRS extraction unit (103) and sets the units of frequency allocation (RBG) at a CQ1 estimation unit (104) and allocation unit (105), matches the frequency position at the end of the SRS reception band to the frequency position at the end of any of the units of frequency allocation and sets the reception bandwidth of the reference signal to a natural number multiple of the bandwidth of the unit of frequency allocation. In the terminal apparatus (200), a band information setting unit (204), which sets the transmission band and units of frequency allocation (RBG), matches the frequency position at the end of the transmission band to the frequency position at the end of any of the units of frequency allocation and sets the transmission bandwidth of the SRS to a natural number multiple of the bandwidth of the unit of frequency allocation.

17 Claims, 16 Drawing Sheets

(51) Int. Cl.
   *H04B 1/713*   (2011.01)
   *H04W 24/00*   (2009.01)
   *H04W 72/08*   (2009.01)
   *H04W 88/08*   (2009.01)

(52) U.S. Cl.
   CPC .......... *H04L 5/0057* (2013.01); *H04L 5/0064* (2013.01); *H04W 72/042* (2013.01); *H04W 72/0453* (2013.01); *H04B 1/713* (2013.01); *H04W 24/00* (2013.01); *H04W 72/085* (2013.01); *H04W 88/08* (2013.01)

(56) References Cited

U.S. PATENT DOCUMENTS

| | | | |
|---|---|---|---|
| 9,184,891 | B2 | 11/2015 | Iwai et al. |
| 2009/0046674 | A1 | 2/2009 | Gao et al. |
| 2009/0181687 | A1* | 7/2009 | Tiirola ................ H04L 27/2613 |
| | | | 455/450 |
| 2009/0238241 | A1 | 9/2009 | Hooli et al. |
| 2009/0245193 | A1 | 10/2009 | Gaal et al. |
| 2009/0303946 | A1* | 12/2009 | Yokoyama ............ H04L 5/0007 |
| | | | 370/329 |
| 2012/0008589 | A1 | 1/2012 | Iwai et al. |
| 2012/0063412 | A1 | 3/2012 | Kiyoshima et al. |
| 2015/0270941 | A1 | 9/2015 | Iwai et al. |
| 2016/0028523 | A1 | 1/2016 | Iwai et al. |

OTHER PUBLICATIONS

3GPP TS 36.212 V8.5.0, "3rd Generation Partnership Project; Technical Specification Group Radio Access Network; Evolved Universal Terrestrial Radio Access (E-UTRA); Multiplexing and channel coding (Release 8)," Dec. 2008, 58 pages.

3GPP TS 36.213 V8.5.0, "3rd Generation Partnership Project; Technical Specification Group Radio Access Network; Evolved Universal Terrestrial Radio Access (E-UTRA); Physical layer procedures (Release 8)," Dec. 2008, 74 pages.

International Search Report dated Jul. 13, 2010, for corresponding International Application No. PCT/JP2010/002616, 3 pages.

Notice of the Reasons for Rejection dated Oct. 29, 2013, for corresponding JP Application No. 2011-508260, 3 pages.

Panasonic, "Required number of clusters for non-contiguous resource allocation," R1-101259, 3GPP TSG-RAN WG1 Meeting #60, Agenda Item: 7.1.6 PUSCH Resource allocation, San Francisco, USA, Feb. 22-26, 2010, 8 pages.

Panasonic, "System perfomance of uplink non-contiguous resource allocation," R1-090257, 3GPP TSG RAN WG1 Meeting #55bis, Agenda Item: 12.1, Ljubljana, Jan. 12-16, 2009, 7 pages.

* cited by examiner

F.I.G.2

| SYSTEM BANDWIDTH [RB] | SIZE OF RBG P [RB] |
|---|---|
| <=10 | 1 |
| 11-26 | 2 |
| 27-63 | 3 |
| 64-110 | 4 |

| SYSTEM BW | SIZE OF RBG (P) |
|---|---|
| <=10 | 1 |
| 11–45 | 2 |
| 46–110 | 4 |

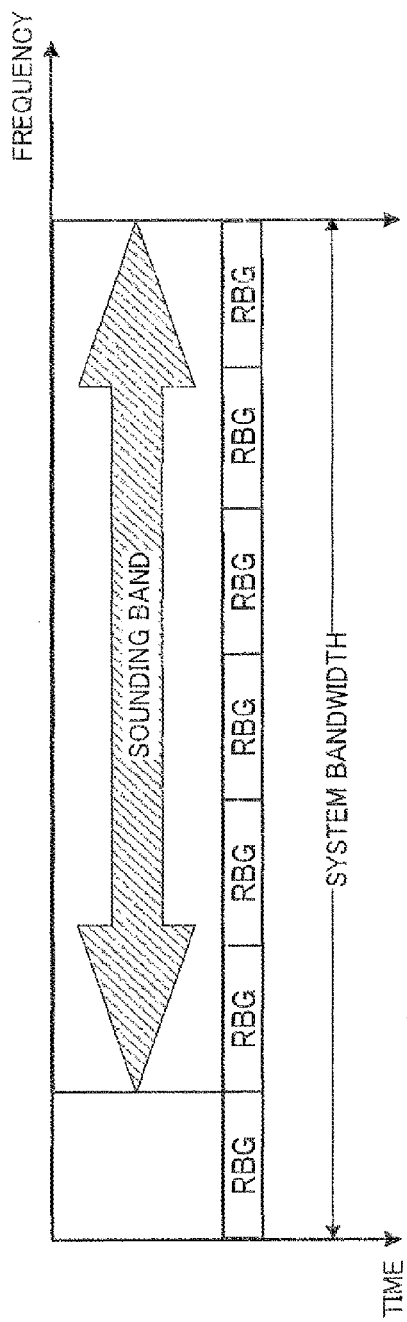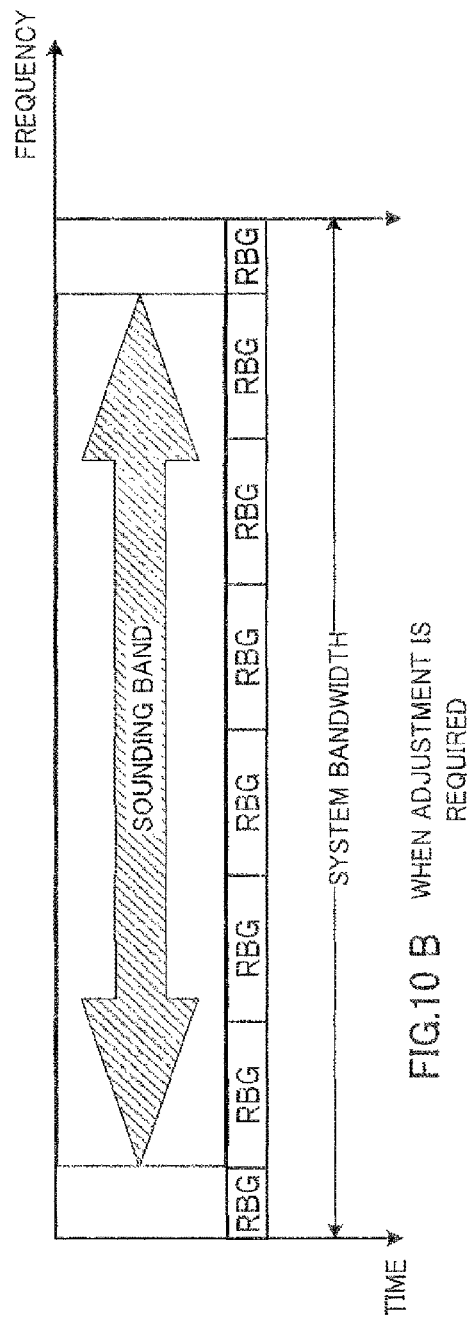

WIRELESS BASE STATION APPARATUS, WIRELESS TERMINAL APPARATUS, FREQUENCY RESOURCE ALLOCATION METHOD, AND METHOD OF FORMING TRANSMISSION SIGNAL

TECHNICAL FIELD

The present invention relates to a radio base station apparatus, a radio terminal apparatus, a method of assigning frequency resources, and a method of forming transmission signals.

BACKGROUND ART

For an uplink channel of LTE-A (LTE-Advanced), which is an evolved version of 3rd generation partnership project long-term evolution (3GPP LTE), using "non-contiguous frequency transmission" in addition to contiguous frequency transmission is under consideration to improve sector throughput performance (see Non-Patent Literature 1).

Non-contiguous frequency transmission is a method of transmitting a data signal and a reference signal by assigning such signals to non-contiguous frequency bands, which are dispersed in a wide range of band. As shown in FIG. 1, in non-contiguous frequency transmission, it is possible to assign a data signal and a reference signal to discrete frequency bands. Therefore, in non-contiguous frequency transmission, compared to contiguous frequency transmission, the flexibility in assigning a data signal and a reference signal to frequency bands in each terminal increases. By this means, it is possible to gain greater frequency scheduling effects.

As a method of reporting frequency resource assignment information for non-contiguous frequency transmission from a base station to a terminal, there is a method of reporting whether or not to perform assignment for each resource block group (RBG) in the system band, using a bitmap (see Non-Patent Literature 2). As shown in FIG. 2, a base station reports to a terminal subject to frequency assignment using one bit whether or not to assign frequency resources per predetermined RBG (per four [RBs] in FIG. 2). That is, in a plurality of RBGs formed by dividing the system band per predetermined RB, including an RBG that is assigned to a terminal subject to frequency assignment (hereinafter referred to as "assigned RBG") and an RBG that is not subject to assignment (hereinafter referred to as "RBG not assigned"), a base station reports to a terminal subject to frequency assignment, a frequency assignment bit sequence that is obtained by assigning the bit value of 1 to one of the above RBGs and assigning the bit value of 0 to the other. In FIG. 2, the RBG to which bit "1" is assigned is frequency area assigned to a terminal subject to assignment while the RBG to which bit "0" is assigned is frequency area that is not subject to assignment to the terminal subject to assignment. Therefore, the number of signaling bits required for frequency resource assignment information matches the number of RBGs in the system bandwidth.

In LTE, as shown in FIG. 3, the size of an RBG (=P) varies depending on the system bandwidth (see Non-Patent Literature 3). As shown in FIG. 3, a greater size of an RBG is used for the broader system bandwidth, reducing the number of signaling bits.

Further, in LTE, a sounding reference signal (SRS) of an uplink channel is used. Here, "sounding" means estimation of channel quality. An SRS is transmitted by time-multiplexing data on a specific symbol, mainly to perform estimation of the channel quality indicator (CQI) of an uplink channel data channel.

Further, among the methods of transmitting SRSs are a method of transmitting SRSs in the transmission bandwidth as broad as the system bandwidth (i.e. method of transmitting SRSs in a broad band), and a method of transmitting SRSs in which SRSs are transmitted in a narrow band at each transmission timing by changing transmission frequency bands in time sequence (that is, by performing frequency hopping) (i.e. method of transmitting SRSs in a narrow band). When the broad-band SRS transmission method is used, CQIs are estimated over a broad band at one time. Further, when the narrow-band SRS transmission method is used, CQIs are estimated over a broad band by using several SRSs transmitted in a narrow band.

Generally, path loss for a signal that is transmitted from a terminal near the cell border and is received by a base station, is significant. Further, because the maximum transmission power of a terminal is limited, in the case of the broad-band SRS transmission, reception power of a base station per unit frequency lowers and the reception SINR lowers. As a result of this, the accuracy of CQI estimation deteriorates. Therefore, for a terminal near the cell border, the narrow-band SRS transmission method for performing transmission so as to focus limited power on a predetermined frequency band, is employed. In contrast, path loss for a signal that is transmitted from a terminal near the cell center and is received by a base station, is small. For this reason, even when the broad-band SRS transmission method is employed, is possible to fully secure reception power of a base station per unit frequency. As a result of this, the broad-band SRS transmission method is employed for a terminal near the cell center.

Further, in LTE, the transmission bandwidth of the broad-band SRS transmission method is set N times (N is an integer) as broad as the transmission bandwidth of the narrow-band SRS transmission method, so as to use the same frequency band in which SRSs can be transmitted (i.e. sounding band, or frequency band with which CQI estimation can be performed), regardless of the broad-band SRS transmission method or the narrow-band SRS transmission method. That is, when the narrow-band SRS transmission method is employed, CQIs of the same frequency band as the frequency band in the broad-band SRS transmission method are estimated by applying frequency hopping N times. Specifically, in LTE, the minimum bandwidth for transmitting SRSs is four RBs, and all of the transmission bandwidths of SRSs are formed with RBs of multiples of four (see Non-Patent Literature 4).

CITATION LIST

Non-Patent Literature

NPL 1
3GPP R1-090257, Panasonic, "System performance of uplink non-contiguous resource allocation"
NPL 2
3GPP TS36.212 V8.5.0. 5.3.3.1.2 Format 1, "E-UTRA Multiplexing and channel coding (Release 8)"
NPL 3
3GPP TS36.213 V8.5.0. 7.1.6.1 Resource allocation type 0, "Physical layer procedures (Release 8)"

NPL 4

3GPP TS36.211 V8.5.0. 5.5.3.2 Mapping to physical resources, "Physical Channels and Modulation (Release 8)"

SUMMARY OF INVENTION

Technical Problem

By the way, when the above-described conventional method of reporting frequency resource assignment information for non-contiguous frequency transmission and the SRS transmission method are simply combined, there is a possibility that the borders of SRS transmission bands and RBGs do not match. For example, when the system bandwidth is fifty RBs, as shown in FIG. 3, while the size of an RBG is three RBs, the transmission bandwidth of SRSs are formed with RBs of multiples of four regardless of the system bandwidth. At this time, because the accuracy of CQI estimation for some RBGs deteriorates, frequency scheduling gain lowers and, consequently, system throughput deteriorates.

More specifically, when the broad-band SRS transmission method is employed, as shown in FIG. 4, for the RBGs located at the ends of the SRS transmission band, SRSs are transmitted only in part of the bands of those RBGs. For this reason, it is not possible to perform accurate calculation for estimating the average CQI in the RBG, deteriorating the accuracy of CQI estimation.

On the other hand, when the narrow-band SRS transmission method is employed, as shown in FIG. 5, for the RBGs located at the ends of the sounding band for SRSs (the whole band in which SRSs are transmitted), in the same way as the broad-band SRS transmission method, SRSs are transmitted only in part of the bands of those RBGs. Besides this, for the RBG located on the border of SRSs in the narrow band, all SRSs in the band of that RBG are transmitted only after a plurality of SRSs are transmitted. Because there is a time interval between the timings in which that plurality of SRSs are transmitted, in the environment where there is time fading, for example, it is not possible to perform accurate calculation for estimating the average CQI in an RBG, deteriorating the accuracy of CQI estimation.

In view of the above, it is therefore an object of the present invention to provide a radio base station apparatus, a radio terminal apparatus, a method of assigning frequency resources, and a method of forming transmission signals for making it possible to prevent the accuracy of channel estimation from lowering when non-contiguous frequency transmission and SRS transmission are employed in an uplink channel.

Solution to Problem

One aspect of a radio base station apparatus according to the present invention employs a configuration to comprise: an extraction section that extracts a reference signal contained in a reception signal based on a set reception band; a channel estimation section that estimates channel quality per frequency assignment unit based on the extracted reference signal; an assignment section that assigns frequency resources to a terminal per frequency assignment unit based on a result of the estimation of the channel quality; and an assignment unit setting section that is a section of setting the reception band of the reference signal in the extraction section and setting frequency assignment units in the channel estimation section and the assignment section; makes a frequency position of an end of the reception band match a frequency position of an end of either frequency assignment unit; and sets a width of the reception band of the reference signal as a natural number multiple of a bandwidth of the frequency assignment unit.

One aspect of a radio terminal apparatus according to the present invention employs a configuration to comprise: a formation section that forms a transmission signal by mapping a reference signal to a set transmission band and mapping transmission data based on assignment information per frequency assignment unit; and a band setting section that is a section of setting the transmission band and the frequency assignment units; makes a frequency position of an end of the transmission band match a frequency position of an end of either frequency assignment unit; and sets a width of the transmission band of the reference signal as a natural number multiple of a bandwidth of the frequency assignment unit.

One aspect of a method of assigning frequency resources according to the present invention employs a configuration to comprise steps of: setting a reception band and frequency assignment units of a reference signal; extracting the reference signal contained in a reception signal based on the set reception band; estimating channel quality per set frequency assignment unit based on the extracted reference signal; assigning frequency resources to a terminal per frequency assignment unit based on a result of the estimation of the channel quality; wherein a frequency position of an end of the reception band is made match a frequency position of an end of either frequency assignment unit, and a width of the reception band of the reference signal is a natural number multiple of a bandwidth of the frequency assignment unit.

One aspect of a method of forming transmission signals according to the present invention employs a configuration to comprise steps of: setting a transmission band and frequency assignment units; and forming a transmission signal by mapping a reference signal to the set transmission band and mapping transmission data based on assignment information per set frequency assignment unit; wherein a frequency position of an end of the transmission band is made match a frequency position of an end of either frequency assignment unit, and a width of the transmission band of the reference signal is a natural number multiple of a bandwidth of the frequency assignment unit.

Advantageous Effects of Invention

According to the present invention, it is possible to provide a radio base station apparatus, a radio terminal apparatus, a method of assigning frequency resources, and a method of forming transmission signals for making it possible to prevent the accuracy of channel estimation from lowering when non-contiguous frequency transmission and SRS transmission are employed in an uplink channel.

ADVANTAGEOUS EFFECTS OF INVENTION

FIG. 3 shows dependency of the size of RBG on the system bandwidth;

FIG. 8 shows the basic size of an RBG when the transmission bandwidth of an SRS is set as four RBs;

FIGS. 10A and 10B show RBG groups defined in the system bandwidth according to where the sounding band is positioned in the system band;

DESCRIPTION OF EMBODIMENTS

Figure 1:
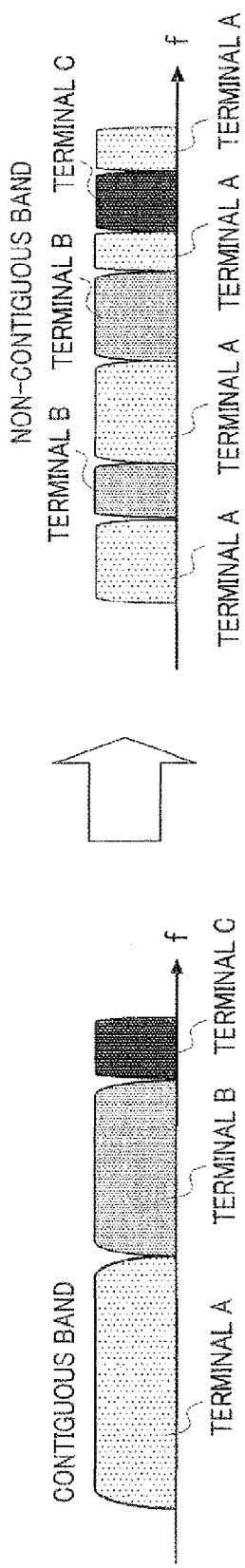
FIG. 1 shows non-contiguous frequency transmission.
Figure 2:
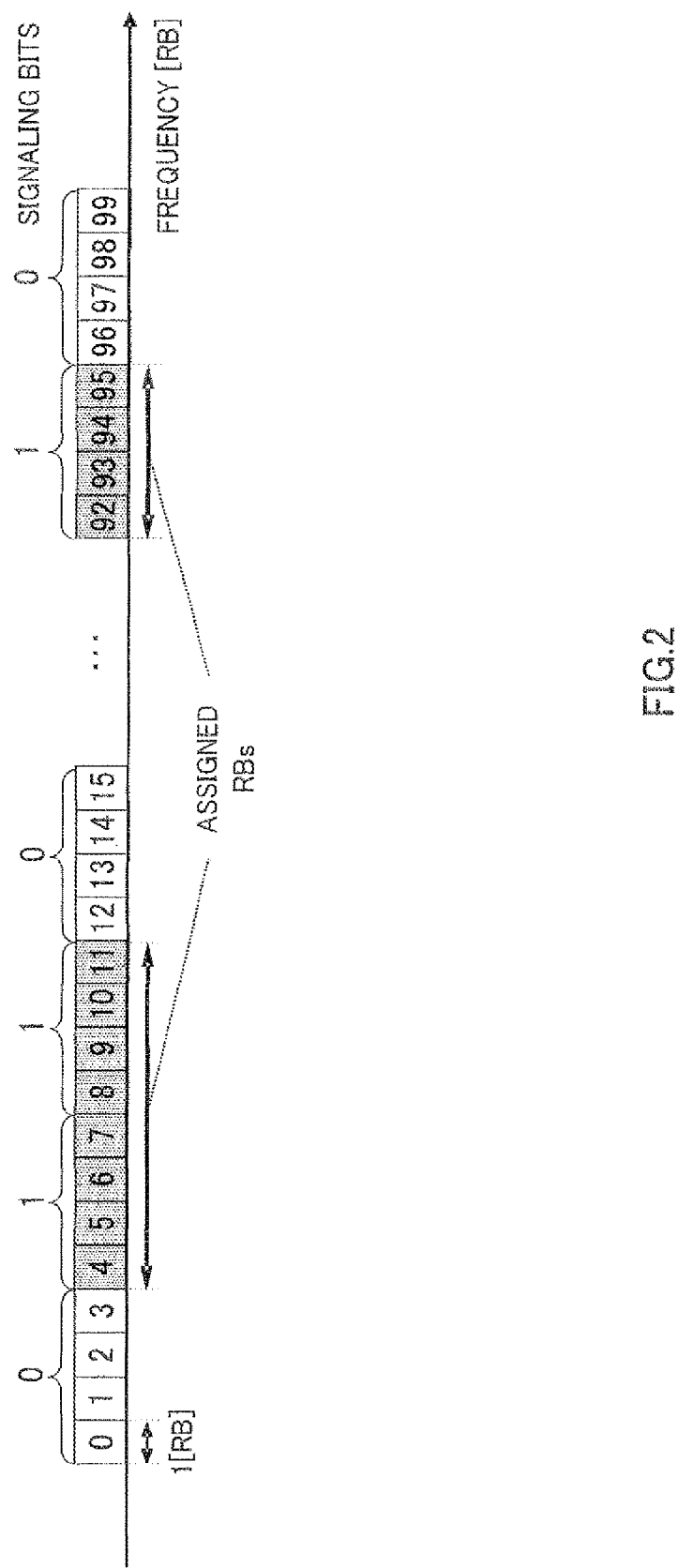
FIG. 2 shows a method of reporting frequency resource assignment information for non-contiguous frequency transmission.
Figure 4:
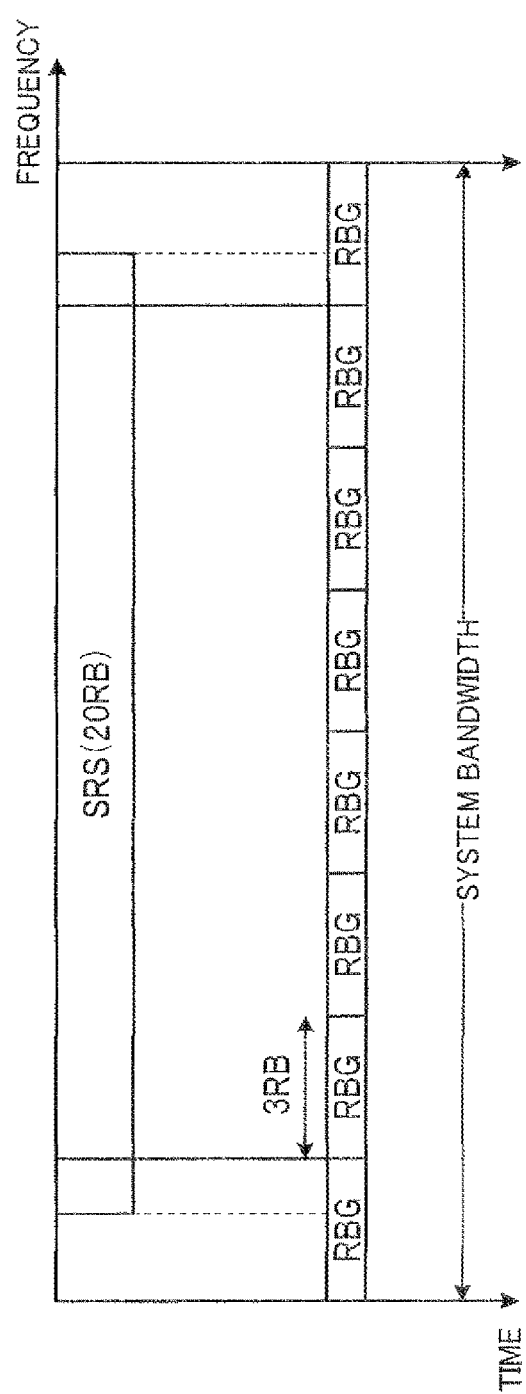
FIG. 4 shows a case where non-contiguous frequency transmission and broad-band SRS transmission are employed in an uplink channel.
Figure 5:
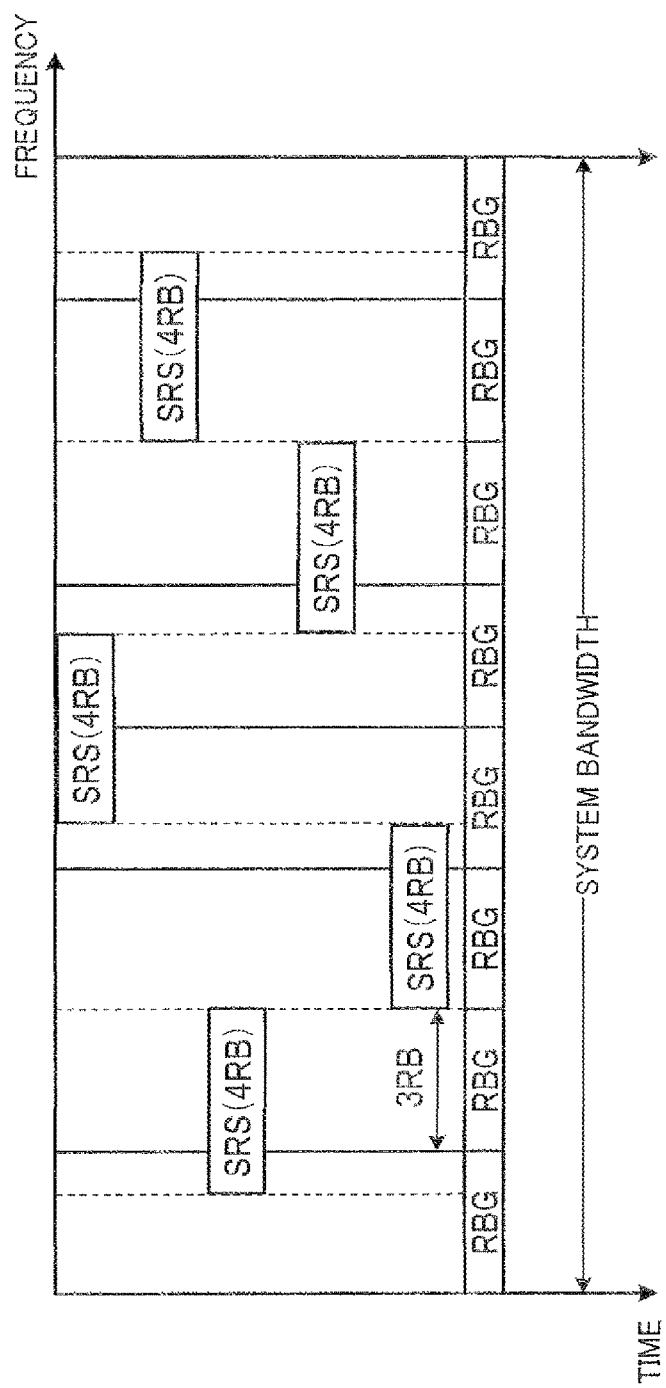
FIG. 5 shows a case where non-contiguous frequency transmission and narrow-band SRS transmission are employed in an uplink channel.

Now, embodiments of the present invention will be described in detail with reference to the accompanying drawings. In embodiments, the same parts will be assigned the same reference numerals and overlapping explanations will be omitted.

Embodiment 1

Figure 6:
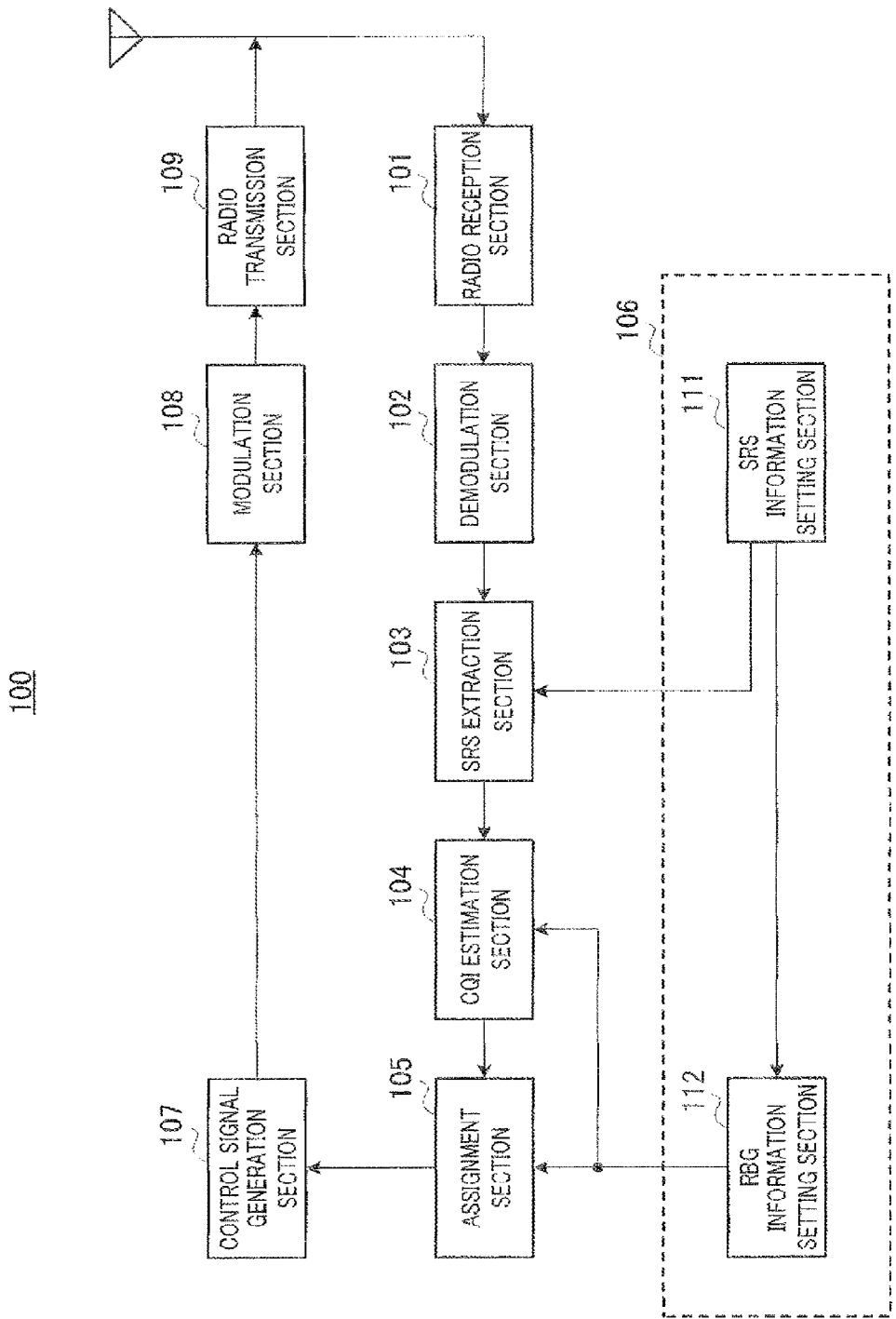
FIG. 6 is a block diagram showing a configuration of a base station apparatus according to Embodiment 1 of the present invention.

FIG. 6 is a block diagram showing a configuration of a base station apparatus 100 according to Embodiment 1 of the present invention. In FIG. 6, base station apparatus 100 includes radio reception section 101, demodulation section 102, SRS extraction section 103, CQI estimation section 104, assignment section 105, assignment unit setting section 106, control signal generation section 107, modulation section 108, and radio transmission section 109.

Radio reception section 101 performs reception processing, such as down-conversion and A/D conversion, on a signal received from terminal apparatus 200 (described later) via an antenna, and outputs the reception-processed signal to demodulation section 102.

Demodulation section 102 demodulates the signal received from radio reception section 101 and outputs the demodulated signal to SRS extraction section 103.

SRS extraction section 103 extracts an SRS transmitted from terminal apparatus 200 based on SRS information received from assignment unit setting section 106. SRS information includes information about the transmission bandwidth, the position of the transmission band, and the frequency hopping pattern with which terminal apparatus 200 transmits an SRS. When viewed from base station apparatus 100, SRS information contains information about the reception bandwidth and the position of the reception band in which an SRS is received at one timing, and the hopping pattern of that position of the reception band. The extracted SRS is output to CQI estimation section 104.

CQI estimation section 104 estimates channel quality (CQI) between base station apparatus 100 and terminal apparatus 200 by performing correlation calculation between the reception SRS extracted from SRS extraction section 103 and an SRS replica known between base station apparatus 100 and terminal apparatus 200. This correlation calculation is performed per RBG based on the RBG information received from assignment unit setting section 106. RBG information contains the basic size and the position of an RBG.

The result of the channel quality estimation is output to assignment section 105. Here, in the same way as in the above-described conventional technique, when the broadband SRS transmission method is employed, the estimation result of channel quality for the whole sounding band can be obtained at one timing, while, when the narrow-band SRS transmission method is employed, SRSs are transmitted only in part of the transmission band of the sounding band at one timing, so that it is possible to obtain the estimation result of channel quality for the whole sounding band by performing correlation calculation on the reception SRS a plurality of times.

Assignment section 105 assigns frequency resources to terminal 200 subject to frequency assignment, per RBG unit that is determined by the RBG information received from assignment unit setting section 106. This assignment of frequency resources is performed based on the result of channel estimation obtained in CQI estimation section 104 for each RBG. Assignment section 105 generates a frequency resource assignment bit sequence corresponding to the arrangement pattern of the RBG subject to assignment in the system band and the RBG that is not subject to assignment, and outputs the generated frequency resource assignment bit sequence to control signal generation section 107.

Assignment unit setting section 106 outputs SRS information containing information about the transmission bandwidth, the position of the transmission band, and the frequency hopping pattern with which terminal apparatus 200 transmits an SRS at one timing, to SRS extraction section 103, and outputs the RBG information containing the basic size and the frequency position of an RBG to assignment section 105. Here, the frequency position of an end of an arbitrary SRS transmission band that is determined by SRS information matches the frequency position of an end of either RBG that is determined by RBG information. Further, the basic size of an RBG contained in RBG information (i.e. standard bandwidth of an RBG) is a divisor of the transmission bandwidth contained in SRS information. That is, the transmission bandwidth contained in SRS information is a natural number multiple of the basic size of an RBG contained in RBG information.

Specifically, assignment unit setting section 106 includes SRS information setting section 111 and RBG information setting section 112.

SRS information setting section 111 outputs SRS information to SRS extraction section 103. Further, SRS information setting section 111 outputs the minimum bandwidth of an SRS (represented by the number of RBs) and information about the border of the transmission band of an SRS, to RBG information setting section 112. Information about the border of the transmission band of an SRS refers to the start position of the sounding band, for example.

RBG information setting section 112 determines the basic size of an RBG depending on the system bandwidth. This basic size of an RBG is a divisor of the transmission bandwidth with which terminal apparatus 200 transmits an SRS at one timing. Further, RBG information setting section 112 determines the frequency position of an RBG so that the frequency position of an end of the transmission band indicated by information about the border of the transmission band of an SRS received from SRS information setting section 111 matches the frequency position of an end of an RBG.

Information about the basic size of an RBG and the frequency position of the RBG thus determined is output as RBG information to CQI estimation section 104 and assignment section 105.

Control signal generation section 107 generates a control signal containing the frequency resource assignment bit sequence received from assignment section 105, and outputs the generated control signal to modulation section 108.

Modulation section 108 modulates the control signal and outputs the modulated signal to radio transmission section 109.

Radio transmission section 109 performs transmission processing, such as D/A conversion, up-conversion, and amplification, on the modulated signal, and transmits by radio the transmission-processed signal via the antenna.

Figure 7:
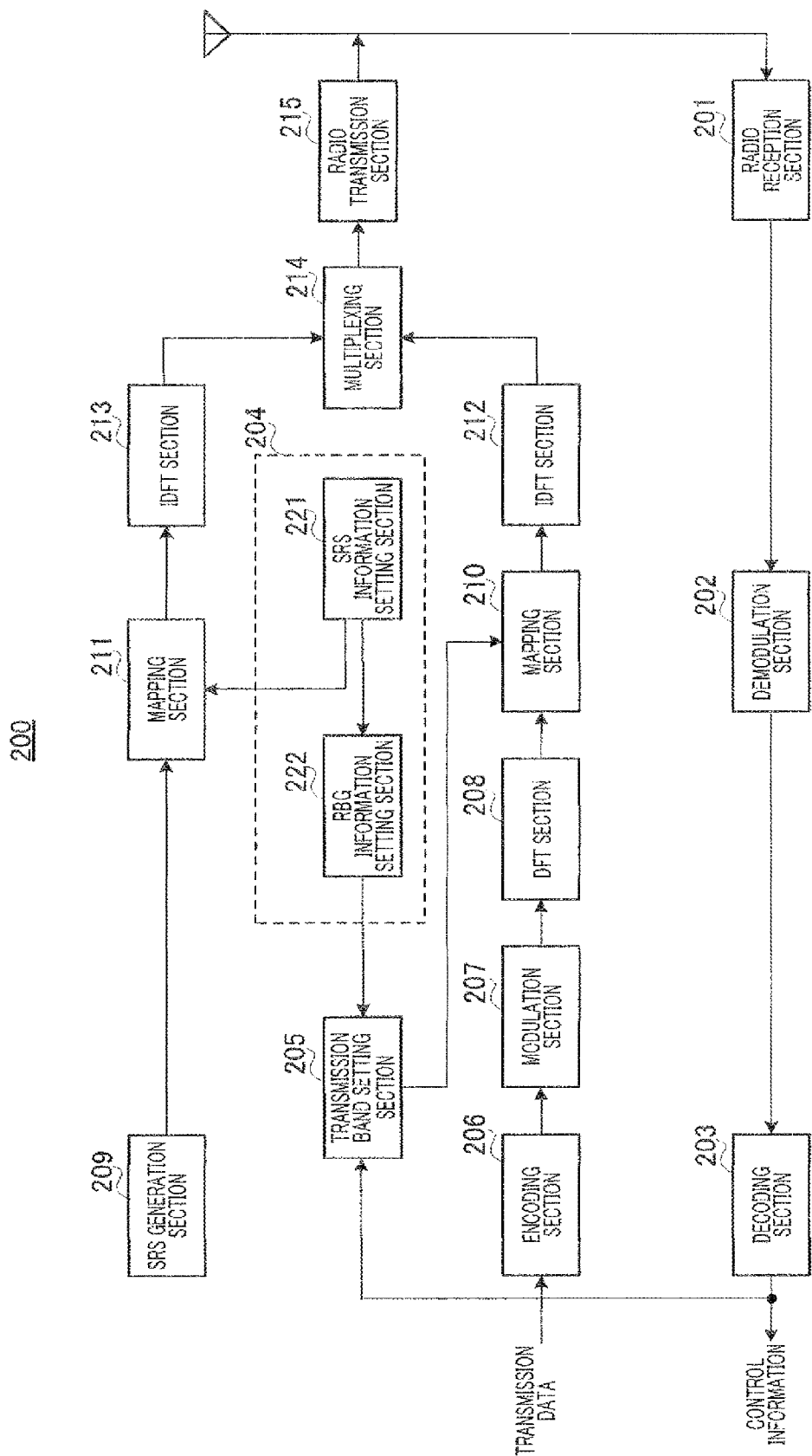
FIG. 7 is a block diagram showing a configuration of a terminal apparatus according to Embodiment 1 of the present invention.

FIG. 7 is a block diagram showing a configuration of terminal apparatus 200 according to Embodiment 1 of the present invention. In FIG. 7, terminal apparatus 200 includes radio reception section 201, demodulation section 202, decoding section 203, band information setting section 204, transmission band setting section 205, encoding section 206, modulation section 207, DFT section 208, SRS generation section 209, mapping sections 210 and 211, IDFT sections 212 and 213, multiplexing section 214, and radio transmission section 215.

Radio reception section 201 performs reception processing, such as down-conversion and A/D conversion, on a signal received via the antenna, and outputs the reception-processed signal to demodulation section 202.

Demodulation section 202 demodulates the reception signal and outputs the demodulated signal to decoding section 203.

Decoding section 203 performs decoding processing on the signal received from demodulation section 202 and, from the result of the decoding, extracts a control signal containing the frequency resource assignment bit sequence transmitted from base station apparatus 100.

Band information setting section 204 outputs SRS information containing the information about the transmission bandwidth, the position of the transmission band, and the frequency hopping pattern with which terminal apparatus 200 transmits an SRS at one timing, to mapping section 211, and outputs RBG information containing the basic size and the frequency position of an RBG to transmission band setting section 205. Here, the frequency position of an end of an arbitrary SRS transmission band that is determined by SRS information matches the frequency position of an end of either RBG that is determined by RBG information. Further, the basic size of an RBG contained in RBG information (i.e. standard bandwidth of an RBG) is a divisor of the transmission bandwidth contained in SRS information. That is, the transmission bandwidth contained in SRS information is a natural number multiple of the basic size of an RBG contained in RBG information.

Specifically, band information setting section 204 includes SRS information setting section 221 and RBG information setting section 222.

SRS information setting section 221 outputs SRS information to mapping section 211. Further, SRS information setting section 221 outputs the minimum bandwidth of an SRS (represented by the number of RBs) and information about the border of the transmission band of an SRS, to RBG information setting section 222. Information about the border of the transmission band of an SRS refers to the start position of the sounding band, for example.

RBG information setting section 222 determines the basic size of an RBG depending on the system bandwidth. This basic size of an RBG is a divisor of the transmission bandwidth with which terminal apparatus 200 transmits an SRS at one timing. Further, RBG information setting section 222 determines the frequency position of an RBG so that the frequency position of an end of the transmission band indicated by information about the border of the transmission band of an SRS received from SRS information setting section 221 matches the frequency position of an end of an RBG. Information about the basic size of the RBG and the frequency position of the RBG thus determined is output as RBG information to transmission band setting section 205.

Transmission band setting section 205 designates the assigned RBG based on a bit value of a constituent bit of the frequency resource assignment bit sequence contained in control information received from decoding section 203, out of the RBG groups in which the basic size and the frequency position are detected based on the RBG information received from band information setting section 204, and outputs the basic size and the frequency position of the designated assigned RBG as transmission band information to mapping section 210. That is, the band designated from the basic size and the frequency position of the assigned RBG is the transmission band.

Encoding section 206 encodes transmission data and outputs the obtained encoded data to modulation section 207.

Modulation section 207 modulates the encoded data received from encoding section 206 and outputs the data-modulated signal to DFT section 208.

DFT section 208 performs DFT processing on the data-modulated signal received from modulation section 207 and outputs the obtained frequency domain data signal to mapping section 210.

Mapping section 210 maps the data signal received from DFT section 208 to the frequency resources indicated by transmission band information received from transmission band setting section 205, and outputs the obtained signal to IDFT section 212.

IDFT section 212 performs IDFT processing on the signal received from mapping section 210, and outputs the obtained signal to multiplexing section 214.

SRS generation section 209 generates an SRS to measure channel quality of an uplink channel data channel, and outputs the generated SRS to mapping section 211.

Mapping section 211 arranges an SRS on the frequency/time resources designated by SRS information received from band information setting section 204, and outputs the obtained signal to IDFT section 213.

IDFT section 213 performs IDFT processing on the signal received from mapping section 211, and outputs the obtained signal to multiplexing section 214.

Multiplexing section 214 multiplexes the data signal received from IDFT section 213 with the SRS, and outputs the obtained multiplexed signal to radio transmission section 215.

Radio transmission section 215 performs transmission processing, such as D/A conversion, up-conversion, and amplification, on the multiplexed signal received from multiplexing section 214, and transmits the obtained radio signal to base station apparatus 100 from the antenna.

Operations of base station apparatus 100 and terminal apparatus 200 having the above configuration will be described below.

Base station apparatus 100 assigns frequency resources to terminal 200 subject to frequency assignment, per RBG unit, based on the result of the channel estimation obtained for each RBG, and generates a frequency resource assignment bit sequence corresponding to an arrangement pattern of RBGs subject to assignment in the system band and RBGs that are not subject to assignment. Then, base station apparatus 100 transmits the frequency resource assignment bit sequence to terminal apparatus 200. Terminal apparatus 200 performs data transmission using the frequency resources designated based on the received frequency resource assignment bit sequence.

Specifically, in base station apparatus 100, SRS extraction section 103 extracts an SRS in the SRS reception band designated from the reception signal received via radio reception section 101 and demodulation section 102, based on the SRS information received from assignment unit setting section 106. SRS information includes information about the reception bandwidth and the position of the reception band of an SRS at one timing, and the frequency hopping pattern of that position of the reception band. As described above, among the methods of transmitting SRSs are a method of transmitting SRSs in a broad band and a method of transmitting SRSs in a narrow band. In the broad-band SRS transmission method, SRSs are transmitted in one transmission band (i.e. sounding band) at all timings of SRS transmission. Therefore, when the broad-band SRS transmission method is employed, SRS information contains information indicating that the position of the reception band is not subject to hopping.

CQI estimation section 104 obtains the result of channel estimation per RBG by performing correlation calculation between the reception SRS extracted from SRS extraction section 103 and the SRS replica, based on the RBG information received from assignment unit setting section 106. RBG information contains the basic size and the position of an RBG.

Assignment section 105 assigns frequency resources to terminal 200 subject to frequency assignment, per RBG unit determined by the RBG information received from assignment unit setting section 106, based on the result of channel estimation obtained by CQI estimation section 104, and generates a frequency resource assignment bit sequence corresponding to an arrangement pattern of RBGs subject to assignment in the system band and RBGs that are not subject to assignment.

Figure 8:
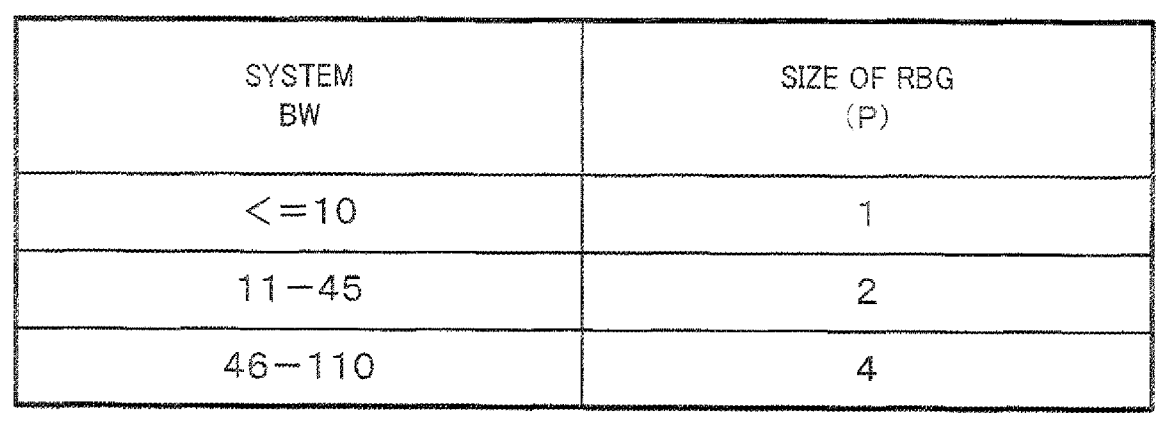

Here, the frequency position of an end of an arbitrary SRS transmission band that is determined by SRS information matches the frequency position of an end of either RBG that is determined by RBG information. Further, the basic size of an RBG contained in RBG information (i.e. standard bandwidth of an RBG) is a divisor of the transmission bandwidth contained in SRS information. That is, the transmission bandwidth contained in SRS information is a natural number multiple of the basic size of the RBG contained in RBG information. For example, because the minimum bandwidth of an SRS for LTE is four RBs, the basic size of an RBG determined by assignment unit setting section 106 is limited to one, two, or four RBs, which are divisors of four RBs, as shown in FIG. 8.

Figure 9:
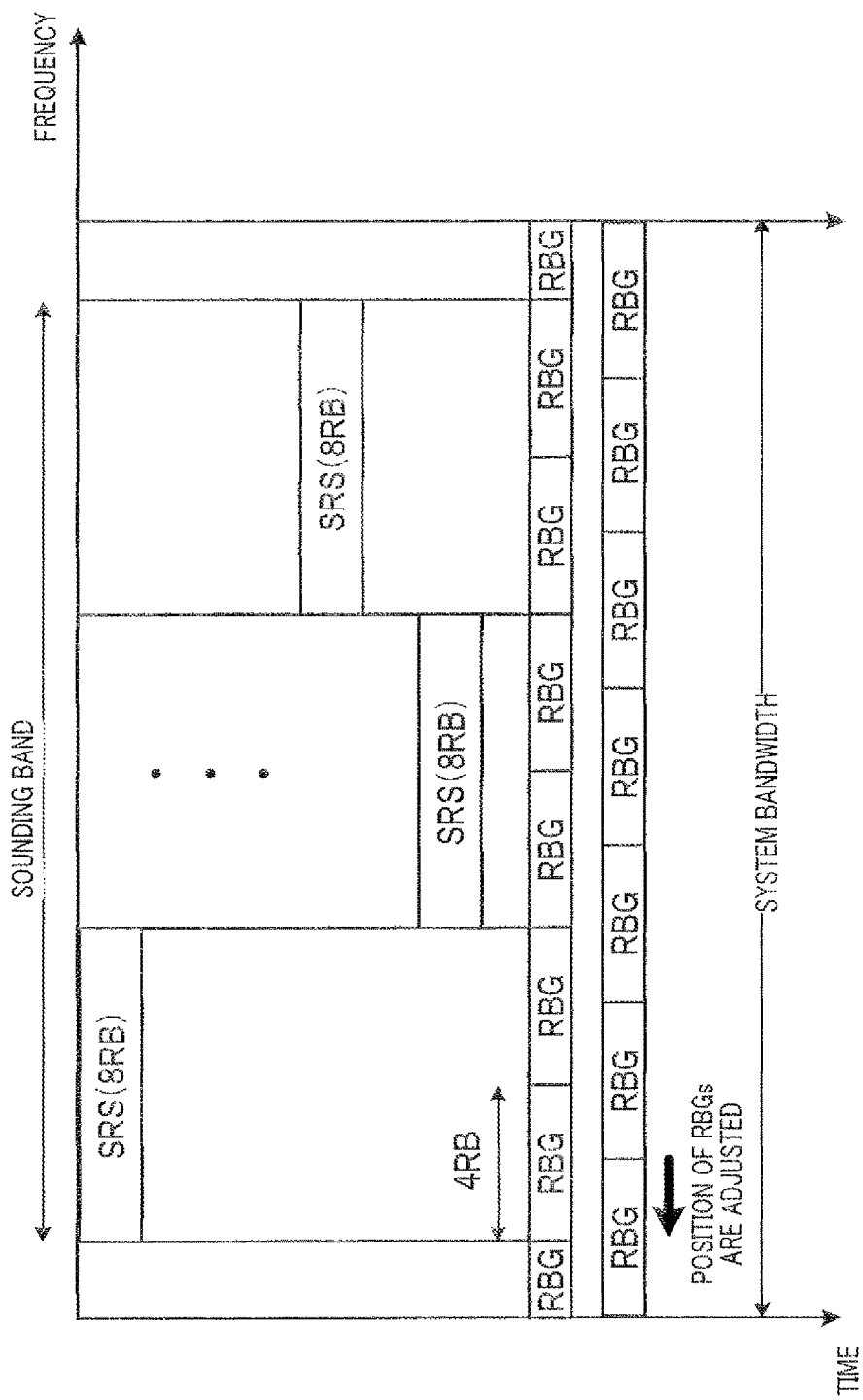
FIG. 9 shows an operation of a base station apparatus.

By this means, as shown in FIG. 9, one SRS is transmitted across RBGs located in the sounding band, without any dead space in each RBG. Therefore, because it is possible to obtain the result of channel estimation using the SRS transmitted at one timing in each RBG, it is possible to prevent the accuracy of CQI estimation from deteriorating. As a result of this, base station apparatus 100 can assign frequency resources to terminal apparatus 200, using a CQI without deterioration of the accuracy, so that it is possible to prevent system throughput performance from deteriorating. Further, the SRS transmission method is the same as the method for LTE, it is possible to multiplex SRSs of a plurality of terminals in the same cell, without differentiating terminals supporting only the LTE system from terminals that can also be applied to the LTE-A system.

Here, as is the case with the present embodiment, when setting the sounding band as the standard and an end of an RBG is made match an end of the sounding band, there is a possibility that RBGs that are smaller than the basic size appear at the both ends of the system band, depending on where the sounding band is positioned in the system band.

FIGS. 10A and 10B show RBG groups defined in the system bandwidth according to where the sounding band is positioned in the system band. In FIG. 10A, the frequency position of an end of the sounding band matches the frequency position of an end of an RBG, under the condition that RBGs are arranged in series from the end of the system band. On the other hand, in FIG. 10B, because the frequency position of an end of the sounding band does not match the frequency position of an end of an RBG, under the condition that RBGs are arranged in series from the end of the system band, the frequency positions of RBGs are shifted to make the frequency position of an end of the sounding band match the frequency position of an end of an RBG.

Between FIG. 10A and FIG. 10B, the positions of the sounding band are different while the system bandwidth and the sounding bandwidth are the same. With this difference, the number of constituent bits of the frequency resource assignment bit sequence is eight in FIG. 10A while the number of constituent bits is nine in FIG. 10B. This is because, in FIG. 10B, each of the RBGs that are smaller than the basic size and are located at the both ends of the system band is counted as one RBG.

As described above, when the number of constituent bits of the frequency resource assignment bit sequence transmitted from base station apparatus 100 to terminal apparatus 200 changes, the transmission format for control signals changes, so that decoding processing for detecting the transmission format increases in terminal apparatus 200.

To resolve this inconvenience, there are the following three methods.

Figure 11:
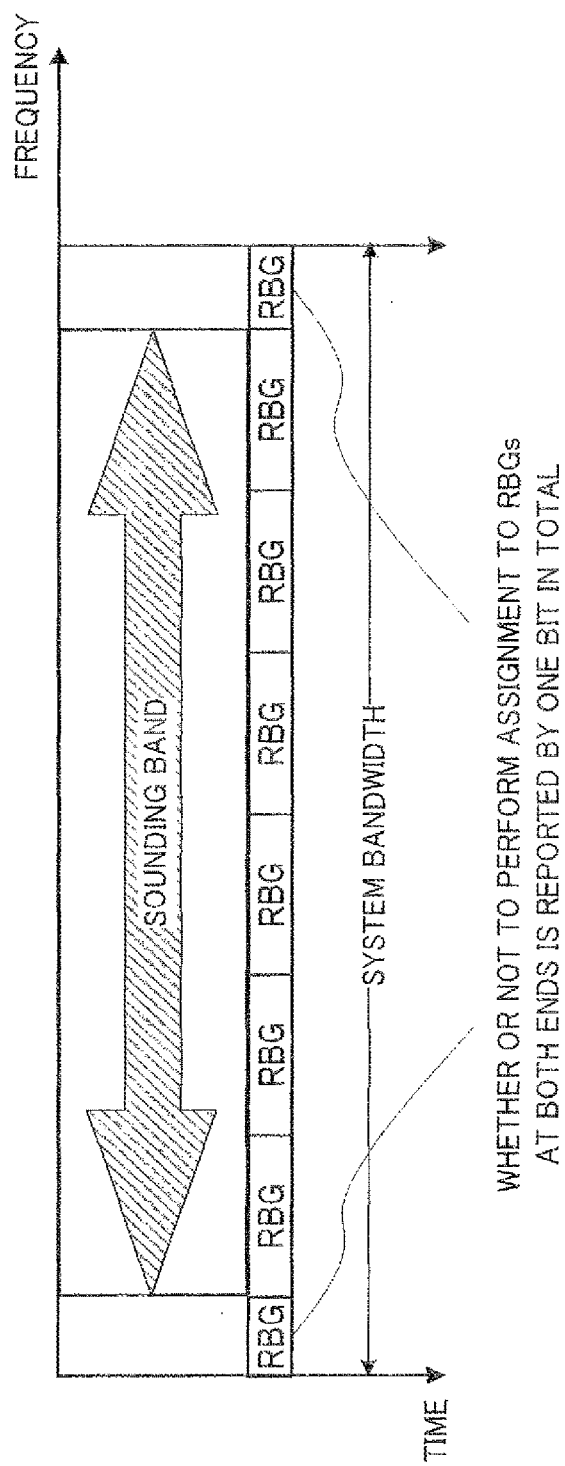
FIG. 11 shows an operation of a base station apparatus.

The first method is that assignment section 105 assigns two RBGs that are smaller than the basic size and are located at the ends of the system band, as one congregation (see FIG. 11). By this means, it is possible to report whether or not two RBGs located at the both ends of the system band are assigned, using one bit, to a terminal subject to frequency assignment. As a result of this, even in the condition of FIG. 10B, assignment section 105 can generate a frequency resource assignment bit sequence using the same number of bits as the number of constituent bits in the condition of FIG. 10A.

Figure 12:
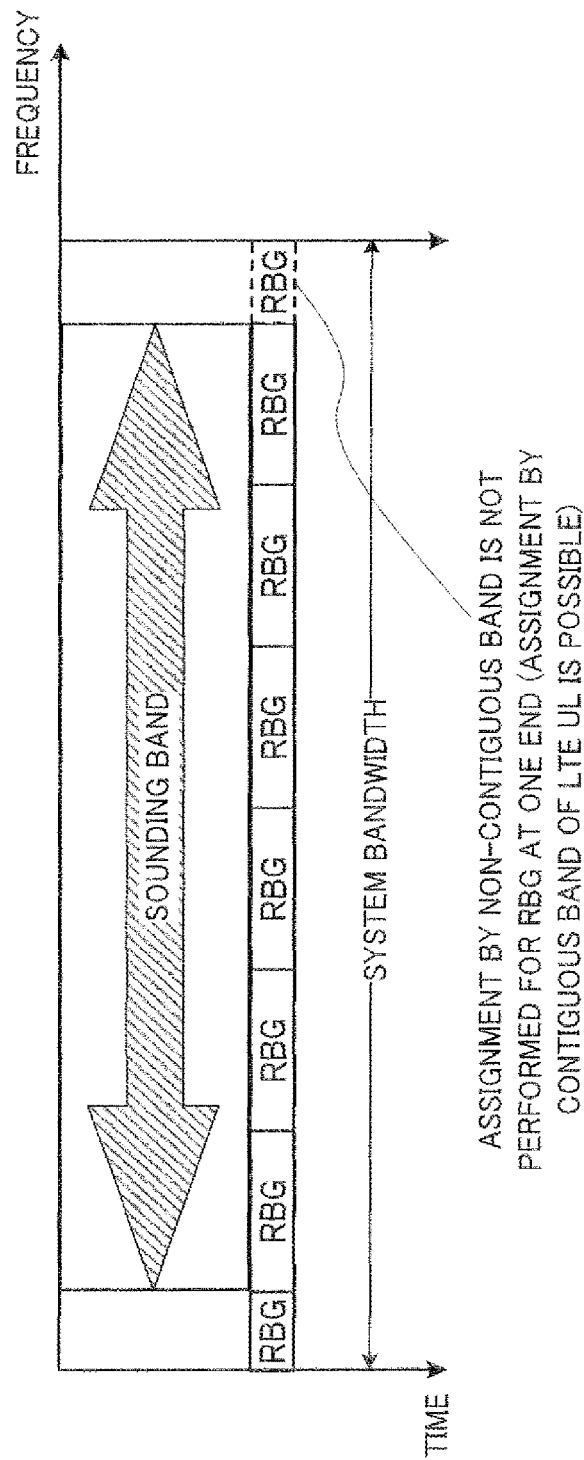
FIG. 12 shows an operation of a base station apparatus.

The second method is that assignment section 105 sets only one of two RBGs that are smaller than the basic size and are located at both ends of the system band as an RBG subject to assignment, and sets the other as an RBG that is not subject to assignment (see FIG. 12). However, "not subject to assignment" here means being not reported whether or not assignment will be performed using a frequency resource assignment bit sequence. Therefore, it is possible to assign this RBG that is not subject to assignment to a terminal subject to frequency assignment, by other signaling methods (for example, a frequency resource assignment bit sequence for contiguous frequency transmission). By this means, even in either condition of FIG. 10A or FIG. 10B, it is possible to use one signaling format. As a result of this, because it is possible to omit decoding processing for detecting the signaling format in terminal apparatus 200, it is possible to prevent the amount of processing in terminal apparatus 200 from increasing.

Figure 13:
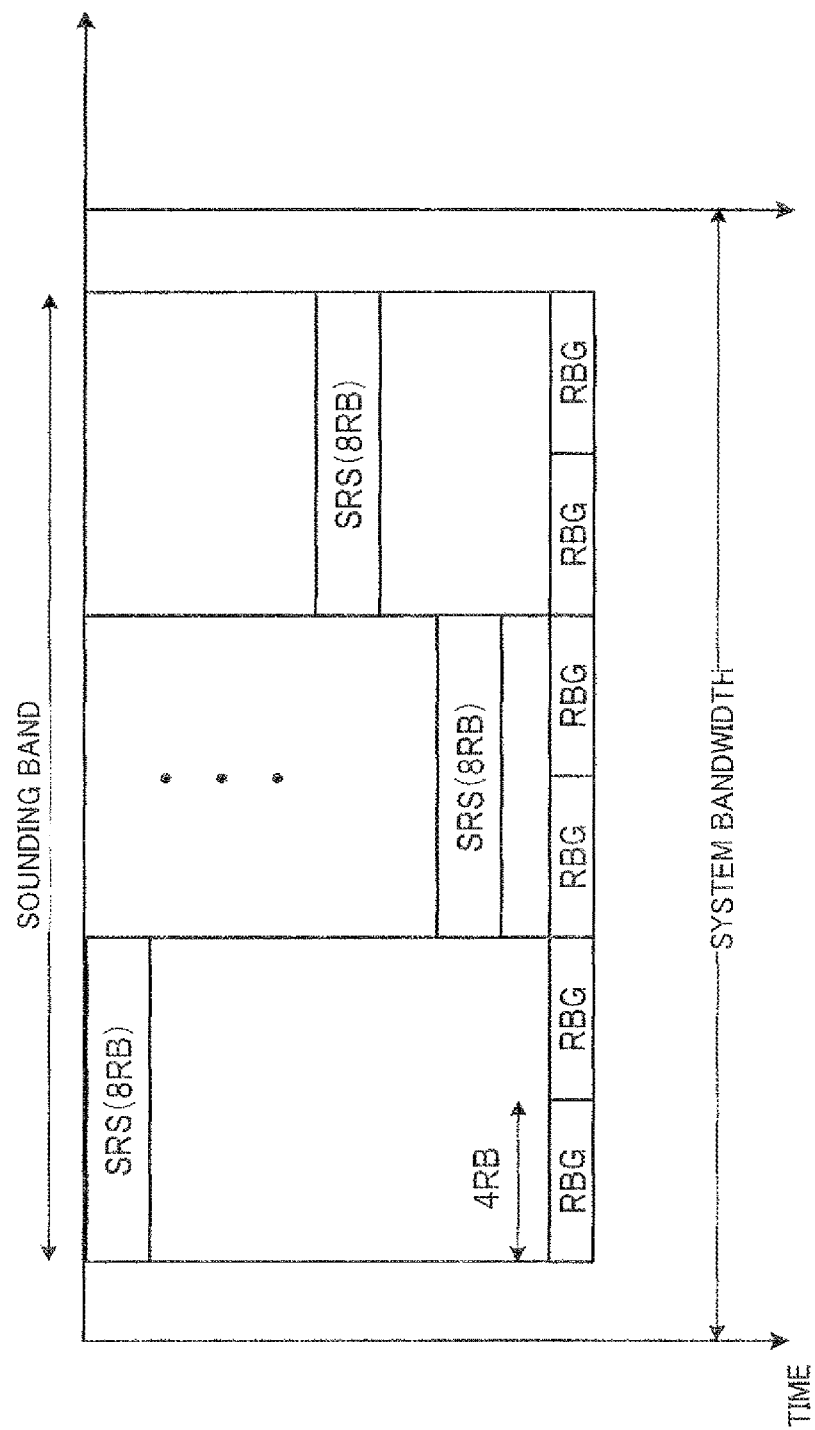
FIG. 13 shows an operation of a base station apparatus.

The third method is that assignment section 105 sets both of two RBGs that are smaller than the basic size and are located at both ends of the system band as RBGs that are not subject to assignment. That is, assignment section 105 makes the band that can be assigned match the sounding band (see FIG. 13). By this means, both of two RBGs that are smaller than the basic size and are located at the ends of the system band are set as the RBGs that are not subject to assignment, it is possible to reduce the number of signaling bits. However, here again, it is possible to assign these RBGs that are not subject to assignment to a terminal subject to frequency assignment, by other signaling methods (for example, by using a frequency resource assignment bit sequence for contiguous frequency transmission). Further, by setting the sounding bandwidth as the maximum value that can be set in the cell, the same number of signaling bits is used in the cell, so that it is possible to use the same signaling format in the cell.

As described above, according to the present embodiment, in base station apparatus 100, assignment unit setting section 106, which sets the reception band of an SRS in SRS extraction section 103 and sets the frequency assignment units (RBGs) in CQI estimation section 104 and assignment section 105, makes the frequency position of an end of the SRS reception band match the frequency position of an end of either frequency assignment unit, and sets the reception bandwidth of a reference signal as a natural number multiple of the bandwidth of the frequency assignment unit.

Further, in terminal apparatus 200, band information setting section 204, which sets the transmission band and the frequency assignment units (RBGs), makes the frequency position of an end of the transmission band match the frequency position of an end of either frequency assignment unit, and sets the transmission bandwidth of an SRS as a natural number multiple of the bandwidth of the frequency assignment unit.

By this means, one SRS is transmitted across RBGs without any dead space in each RBG. Therefore, it is possible to obtain the result of channel estimation using the SRS transmitted at the same timing in each RBG, making it possible to prevent the accuracy of CQI estimation from deteriorating. As a result of this, base station apparatus 100 can assign frequency resources to terminal apparatus 200, using the CQI without deterioration of the accuracy, so that it is possible to prevent system throughput performance from deteriorating.

Embodiment 2

A case has been described with Embodiment 1 where the basic size of an RBG is determined by setting the sounding band as the standard, and an end of the RBG is made match an end of the sounding band. A case will be described with Embodiment 2 where by setting the basic size and the position of an RBG as the standard, the transmission bandwidth with which terminal apparatus 200 transmits an SRS at one timing is determined, and an end of the transmission band of that SRS is made match an end of an RBG.

Figure 14:
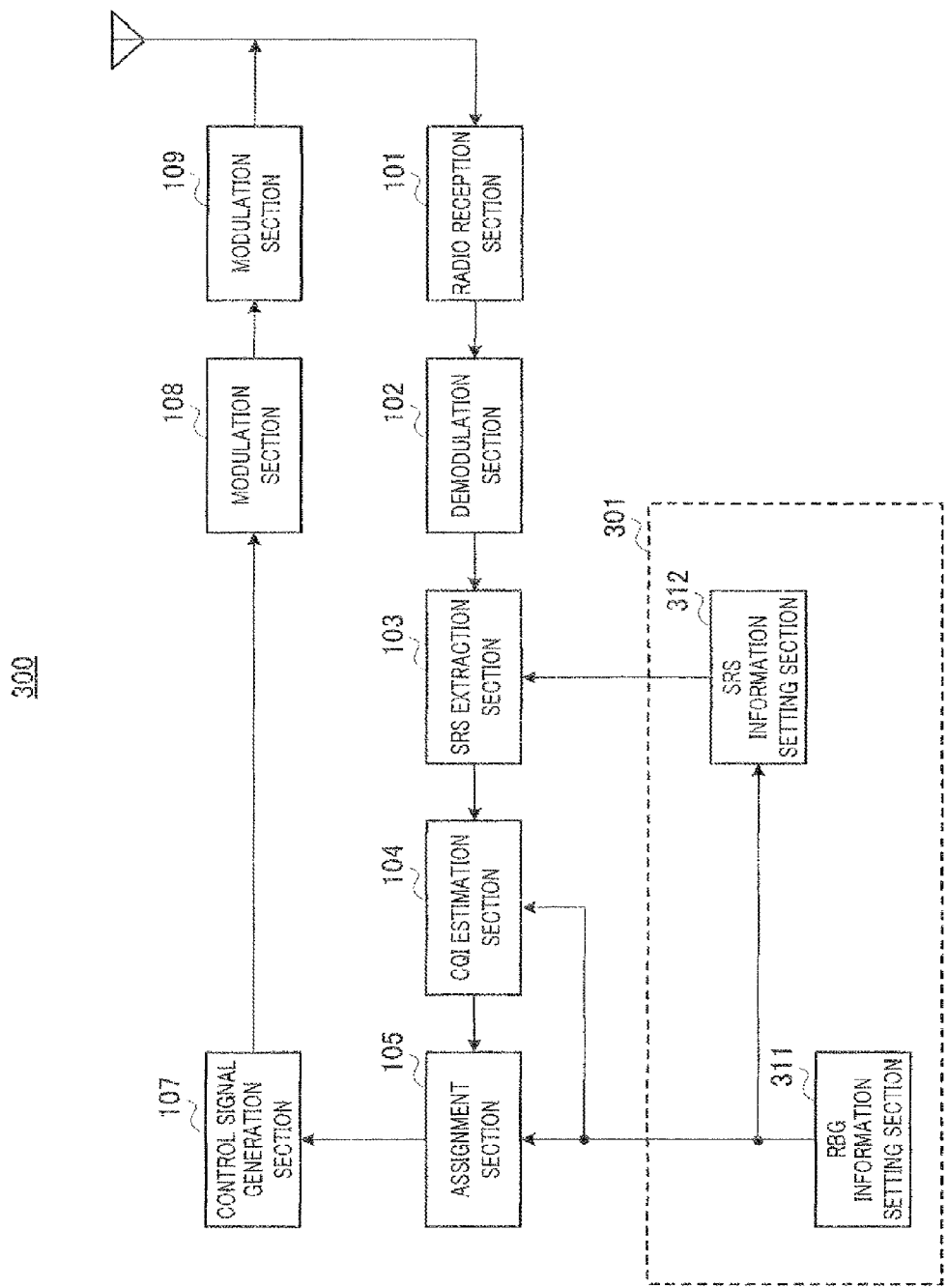
FIG. 14 is a block diagram showing a configuration of a base station apparatus according to Embodiment 2 of the present invention.

FIG. 14 is a block diagram showing a configuration of base station apparatus 300 according to Embodiment 2 of the present invention. Base station apparatus 300 includes assignment unit setting section 301.

Assignment unit setting section 301 outputs SRS information containing information about the transmission bandwidth, the position of the transmission band, and the frequency hopping pattern with which terminal apparatus 400 (described later) transmits an SRS at one timing, to SRS extraction section 103, and outputs RBG information containing the basic size and the frequency position of an RBG to assignment section 105. Here, the frequency position of an end of an arbitrary SRS transmission band that is determined by SRS information matches the frequency position of an end of either RBG that is determined by RBG information. Further, the trans mission bandwidth contained in the SRS information is a natural number multiple of the basic size of the RBG contained in the RBG information.

Specifically, assignment unit setting section 301 includes RBG information setting section 311 and SRS information setting section 312.

RBG information setting section 311 determines the basic size of an RBG depending on the system bandwidth, and determines the frequency position of the RBG. Information about the basic size and the frequency position of the RBG thus determined is output as RBG information to assignment section 105, CQI estimation section 104, and SRS information setting section 312. When following this RBG information, it is possible to arrange RBGs thoroughly in the whole system band from the end of the system band.

SRS information setting section 312 determines the transmission bandwidth with which terminal apparatus 400 transmits an SRS at one timing, depending on the basic size contained in the RBG information received from RBG information setting section 311. Further, SRS information setting section 312 determines the frequency position of an SRS so that the frequency position of an end of the RBG detected by the basic size and the frequency position contained in the RBG information received from RBG information setting section 311 matches the frequency position of an end of the SRS.

Information about the SRS transmission bandwidth, the frequency position of each SRS transmission band, and the hopping pattern of that frequency position thus determined are output as SRS information to SRS extraction section 103.

Figure 15:
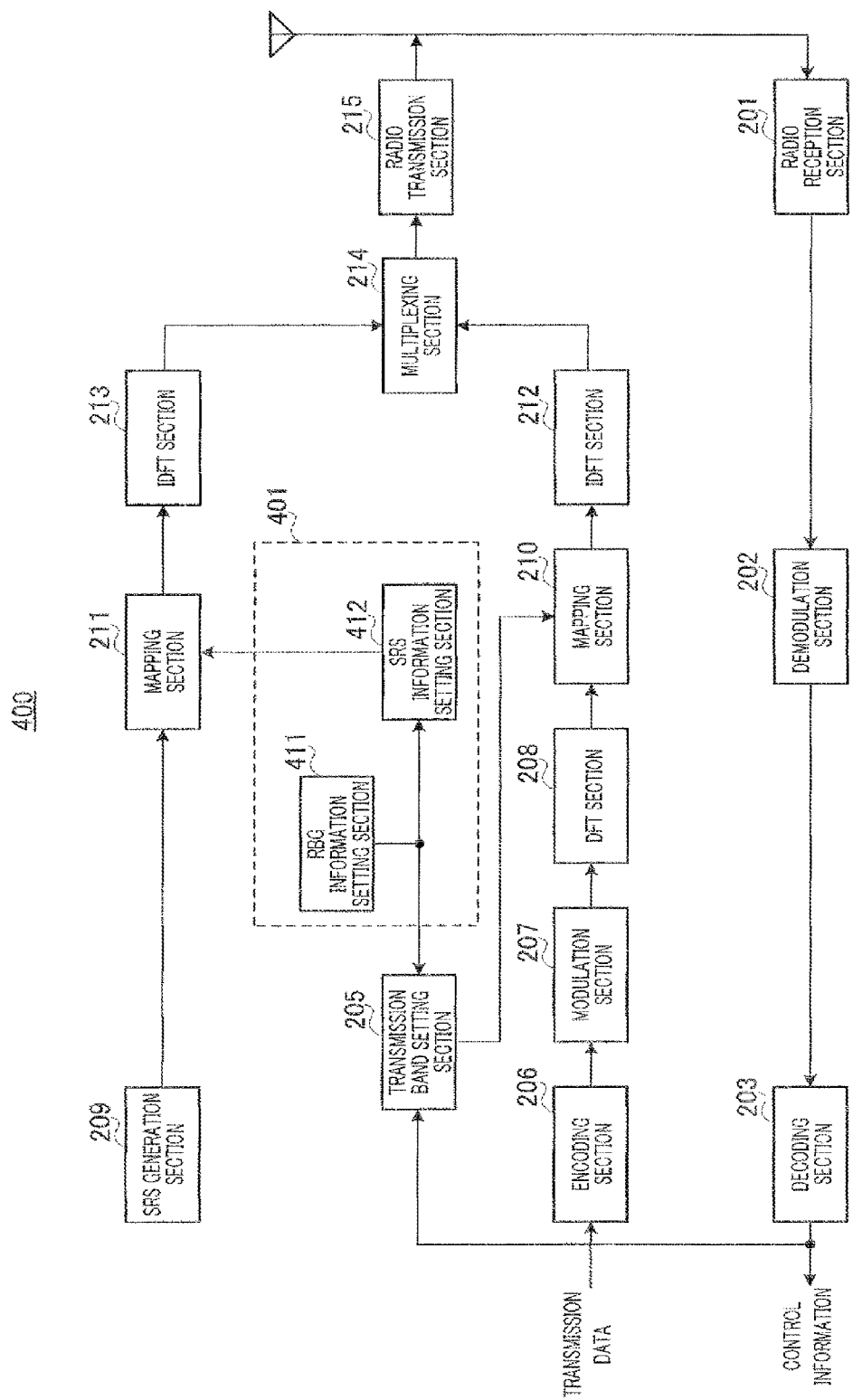
FIG. 15 is a block diagram showing a configuration of a terminal apparatus according to Embodiment 2 of the present invention.

FIG. 15 is a block diagram showing a configuration of terminal apparatus 400 according to Embodiment 2 of the present invention. In FIG. 15, terminal apparatus 400 includes band information setting section 401.

Band information setting section 401 outputs SRS information containing information about the transmission bandwidth, the position of the transmission band, and the frequency hopping pattern, with which terminal apparatus 400 transmits an SRS at one timing, to mapping section 211, and outputs RBG information containing the basic size and the frequency position of an RBG to transmission band setting section 205. Here, the frequency position of an end of an arbitrary SRS transmission band that is determined by SRS information matches the frequency position of an end of either RBG that is determined by RBG information. Further, the transmission bandwidth contained in SRS information is a natural number multiple of the basic size of the RBG contained in RBG information.

Specifically, band information setting section 401 includes RBG information setting section 411 and SRS information setting section 412.

RBG information setting section 411 determines the basic size of an RBG depending on the system bandwidth, and determines the frequency position of the RBG. Information about the basic size and the frequency position of the RBG thus determined is output as RBG information to transmission band setting section 205 and SRS information setting section 412. When following this RBG information, it is possible to arrange RBGs thoroughly in the whole system band from the end of the system band.

SRS information setting section 412 determines the transmission bandwidth with which terminal apparatus 400 transmits an SRS at one timing, depending on the basic size contained in the RBG information received from RBG information setting section 411. Further, SRS information setting section 412 determines the frequency position of an SRS so that the frequency position of an end of the RBG detected by the basic size and the frequency position contained in the RBG information received from RBG information setting section 411 matches the frequency position of an end of the transmission band of the SRS.

Information about the SRS transmission bandwidth, the frequency position of each SRS transmission band, and the hopping pattern of that frequency position thus determined are output as SRS information to mapping section 211.

Operations of base station apparatus 300 and terminal apparatus 400 having the above configuration will be described below.

Base station apparatus 300 assigns the frequency resources to terminal 400 subject to frequency assignment, per RBG unit, based on the result of the channel estimation obtained for each RBG, and generates a frequency resource assignment bit sequence corresponding to an arrangement pattern of RBGs subject to assignment in the system band and RBGs that are not subject to assignment. Then, base station apparatus 300 transmits the frequency resource assignment bit sequence to terminal apparatus 400. Terminal apparatus 400 performs data transmission using the frequency resources designated based on the received frequency resource assignment bit sequence.

Specifically, in base station apparatus 300, assignment section 105 assigns frequency resources to terminal 400 subject to frequency assignment, per RBG unit determined by the RBG information received from assignment unit setting section 301, based on the result of the channel estimation obtained in CQI estimation section 104, and generates a frequency resource assignment bit sequence corresponding to the arrangement pattern of the RBGs subject to assignment in the system band and the RBGs that are not subject to assignment.

Here, the frequency position of an end of an arbitrary SRS transmission band that is determined by SRS information matches the frequency position of an end of either RBG that is determined by RBG information. Further, the transmission bandwidth contained in SRS information is a natural number multiple of the basic size of the RBG contained in RBG information.

Figure 16:
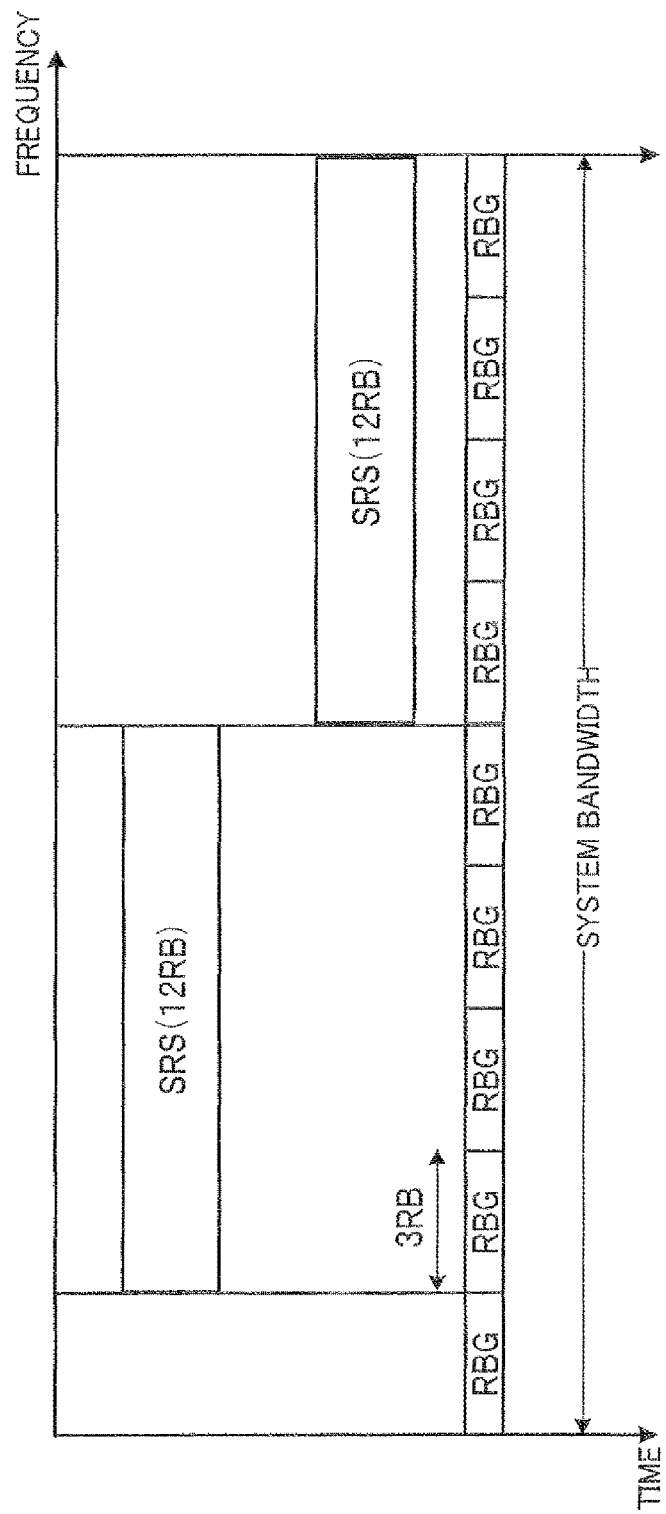
FIG. 16 shows an operation of a base station apparatus.

By this means, as shown in FIG. 16, one SRS is transmitted across RBGs located in the sounding band, without any dead space in each RBG. Therefore, it is possible to obtain the result of channel estimation using the SRS transmitted at one timing in each RBG, making it possible to prevent the accuracy of CQI estimation from deteriorating. As a result of this, base station apparatus 300 can assign frequency resources to terminal apparatus 400, using the CQI without deterioration of the accuracy, so that it is possible to prevent system throughput performance from deteriorating.

It is possible to set the transmission bandwidth of an SRS as multiples of the least common multiple of all sizes of RBGs that can be employed in the system. By this means, in addition to the above-described effects, the transmission bandwidth of an SRS that does not depend on changes of the size of an RBG is set, so that processing in terminal apparatus 400 becomes easy. For example, when the size of an RBG used in the system changes in the range of one, two, three and four RBs, the transmission bandwidth of an SRS is set as integral multiples of twelve RBs, which is the least common multiple of the sizes of those RBGs (for example, twelve, twenty four, or thirty six RBs). By this means, it becomes unnecessary to change the transmission bandwidth of an SRS depending on the change of the size of an RBG.

As described above, according to the present embodiment, in base station apparatus 300, assignment unit setting section 301, which sets the reception band of an SRS in SRS extraction section 103 and sets frequency assignment units (RBGs) in CQI estimation section 104 and assignment section 105, makes the frequency position of an end of the SRS reception band match the frequency position of an end of either frequency assignment unit, and sets the reception bandwidth of a reference signal as a natural number multiple of the bandwidth of the frequency assignment unit.

Further, in terminal apparatus 400, band information setting section 401, which sets the transmission band and the frequency assignment units (RBGs), makes the frequency position of an end of the transmission band match the frequency position of an end of either frequency assignment unit, and sets the transmission bandwidth of an SRS as a natural number multiple of the bandwidth of the frequency assignment unit.

By this means, one SRS is transmitted across RBGs without any dead space in each RBG. Therefore, it is possible to obtain the result of channel estimation using the SRS transmitted at one timing in each RBG, making it possible to prevent the accuracy of CQI estimation from deteriorating. As a result of this, base station apparatus 300 can assign frequency resources to terminal apparatus 400, using the CQI without deterioration of the accuracy, so that it is possible to prevent system throughput performance from deteriorating.

Also, although cases have been described with the above embodiments as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-096221, filed on Apr. 10, 2009, including the specification, drawings and abstract, is incorporated herein by reference in its entirety.

INDUSTRIAL APPLICABILITY

A radio base station apparatus, a radio terminal apparatus, a method of assigning frequency resources, and a method of forming transmission signals according to the present invention are useful for making it possible to prevent the accuracy of channel estimation from lowering when non-contiguous frequency transmission and SRS transmission are employed in an uplink channel.

REFERENCE SIGNS LIST 100, 300 Base station apparatus
101, 201 Radio reception section
102, 202 Demodulation section
103 SRS extraction section
104 CQI estimation section
105 Assignment section
106, 301 Assignment unit setting section
107 Control signal generation section
108, 207 Modulation section
109, 215 Radio transmission section
111, 221, 312, 412 SRS information setting section
112, 222, 311, 411 RBG information setting section
200, 400 Terminal apparatus
203 Decoding section
204, 401 Band information setting section
205 Transmission band setting section
206 Encoding section
208 DFT section
209 SRS generation section
210, 211 Mapping section
212, 213 IDFT section
214 Multiplexing section

What is claimed is:

1. A communication apparatus comprising:
transmission band setting circuitry, which, in operation, configures a plurality of consecutive resource block groups (RBGs) in a system band, and configures a sounding reference signal transmission band (SRS transmission band) on a portion of the system band, wherein a frequency position of an edge of one of the plurality of RGBs matches with a frequency position of an edge of the SRS transmission band; and
mapping circuitry, which, in operation, maps a sounding reference signal (SRS) to the SRS transmission band, a number of RBs included in the SRS transmission band being a multiple of a number of resource blocks (RBs) that form one RBG.

2. The communication apparatus according to claim 1, comprising a transmitter, which, in operation transmits the mapped SRS to a base station.

3. The communication apparatus according to claim 1, wherein the transmission band setting circuitry sets a bandwidth of the SRS transmission band, a position of the SRS transmission band in the system band, and information regarding a frequency hopping pattern of an SRS transmission.

4. The communication apparatus according to claim 1, wherein the number of RBs that form one RBG is determined according to a bandwidth of the system band.

5. The communication apparatus according to claim 1, wherein a minimum number of RBs included in the SRS transmission band is 4.

6. The communication apparatus according to claim 1, wherein the number of RBs included in the SRS transmission band is a multiple of 4.

7. A communication method comprising:
configuring a plurality of consecutive resource block groups (RBGs) in a system band;
configuring a sounding reference signal transmission band (SRS transmission band) on a portion of the system band, wherein a frequency position of an edge of one of the plurality of RBGs matches with a frequency position of an edge of the SRS transmission band; and
mapping a sounding reference signal (SRS) to the SRS transmission band, a number of RBs included in the SRS transmission band being a multiple of a number of resource blocks (RBs) that form one RBG.

8. The communication method according to claim 7, comprising transmitting the mapped SRS to a base station.

9. The communication method according to claim 7, comprising:
setting a bandwidth of the SRS transmission band, a position of the SRS transmission band in the system band and information regarding a frequency hopping pattern of an SRS transmission.

10. The communication method according to claim 7, wherein the number of RBs that form one RBG is determined according to a bandwidth of the system band.

11. The communication method according to claim 7, wherein a minimum number of RBs included in the SRS transmission band is 4.

12. The communication method according to claim 7, wherein the number of RBs included in the SRS transmission band is a multiple of 4.

13. A communication apparatus comprising:
control circuitry, which, in operation,
configures a plurality of consecutive resource block groups (RBGs) in a system band, and configures a sounding reference signal transmission band (SRS transmission band) on a portion of the system band, wherein a frequency position of an edge of one of the plurality of RGBs matches with a frequency position of an edge of the SRS transmission band; and
maps a sounding reference signal (SRS) to the SRS transmission band, a number of RBs included in the SRS transmission band being a multiple of the number of resource blocks (RBs) that form one RBG; and
transmission circuitry, which, in operation, transmits the mapped SRS to a base station.

14. The communication apparatus according to claim 13, wherein the transmission band setting circuitry sets a bandwidth of the SRS transmission band, a position of the SRS transmission band in the system band, and information regarding a frequency hopping pattern of the SRS transmission.

15. The communication apparatus according to claim 13, wherein the number of RBs that form one RBG is determined according to a bandwidth of the system band.

16. The communication apparatus according to claim 13, wherein a minimum number of RBs included in the SRS transmission band is 4.

17. The communication apparatus according to claim 13, wherein the number of RBs included in the SRS transmission band is a multiple of 4.

* * * * *